United States Patent
Hardin

(10) Patent No.: US 10,402,611 B2
(45) Date of Patent: Sep. 3, 2019

(54) AUTOMATED MODIFICATION OF IMAGING SCANNER FUNCTION BASED ON ORIENTATION

(71) Applicant: Datalogic USA Inc., Eugene, OR (US)

(72) Inventor: Wesley W Hardin, Eugene, OR (US)

(73) Assignee: Datalogic USA Inc., Eugene, OR (US)

( * ) Notice: Subject to any disclaimer, the term of this patent is extended or adjusted under 35 U.S.C. 154(b) by 0 days.

(21) Appl. No.: 15/696,007

(22) Filed: Sep. 5, 2017

(65) Prior Publication Data
US 2019/0073499 A1 Mar. 7, 2019

(51) Int. Cl.
*G06K 7/10* (2006.01)
*G06K 7/14* (2006.01)

(52) U.S. Cl.
CPC ....... *G06K 7/10722* (2013.01); *G06K 7/1413* (2013.01)

(58) Field of Classification Search
USPC ......... 235/462.01, 462.41, 462.45, 235/472.01–472.03
See application file for complete search history.

(56) References Cited

U.S. PATENT DOCUMENTS

| | | | |
|---|---|---|---|
| 6,839,133 B2 * | 1/2005 | Gehring | G01V 8/10 356/141.1 |
| 8,297,435 B2 | 10/2012 | Lathem | |
| 8,398,264 B2 | 3/2013 | Anderson et al. | |
| 8,991,705 B2 | 3/2015 | Handshaw et al. | |
| 9,004,359 B2 | 4/2015 | Shearin et al. | |
| 9,039,966 B2 | 5/2015 | Anderson et al. | |
| 9,572,901 B2 | 2/2017 | Todeschini | |
| 9,697,393 B2 | 7/2017 | Stagg et al. | |
| 9,700,641 B2 | 7/2017 | Hawkins et al. | |
| 2002/0104886 A1 * | 8/2002 | Martin | B82Y 15/00 235/462.45 |
| 2004/0065853 A1 | 4/2004 | McQueen | |
| 2006/0113387 A1 * | 6/2006 | Baker | B07C 3/14 235/462.12 |
| 2009/0289121 A1 * | 11/2009 | Maeda | G06K 7/12 235/462.06 |
| 2011/0290889 A1 * | 12/2011 | Tamburrini | G06K 7/10881 235/470 |
| 2012/0000983 A1 | 1/2012 | Bhagwan et al. | |

(Continued)

OTHER PUBLICATIONS

Datalogic Top Down Reader, 7"-bar code scanner top down reader, www.cdw.com/shop/products/datalogic-top-down-reader-7in-bar-code-scanner-top-down-reader/4401137.aspx, Aug. 31, 2017.

(Continued)

*Primary Examiner* — Tuyen K Vo
(74) *Attorney, Agent, or Firm* — Dentons US LLP

(57) ABSTRACT

A code reader may include a housing, an image sensor, and a processing unit. The code reader may include a set of orientations. The housing may be configured to be adjustably oriented, such as rotated. The image sensor may be disposed within the housing, and configured to capture an image of a target area. The processing unit may be disposed within said housing, and be in communication with the image sensor. The processing unit may be configured to, in response to determining an orientation of the housing, select a function so that the code reader is configured to perform the function corresponding with the determined orientation.

20 Claims, 8 Drawing Sheets

(56) References Cited

U.S. PATENT DOCUMENTS

2012/0145792 A1 6/2012 Barron et al.
2013/0126616 A1 5/2013 Zolotov
2016/0132707 A1 5/2016 Lindbo et al.

OTHER PUBLICATIONS

DeLucca, A.J., et al. "Blue light (470 nm) effectively inhibits bacterial and fungal growth," Letters in Applied Microbiology 55, (2012) pp. 460-466.
Indigo-Clean, www.kenall.com/home/products/indigo-clean, printed Dec. 22, 2017, 6 pages.
VioSafe Antibacterial White LED Products, www.vitalvio.com/products, printed Dec. 22, 2017, 7 pages.
International Search Report and Written Opinion corresponding to PCT Patent Application No. PCT/US2018/049620, dated Nov. 20, 2018, 9 pages.

\* cited by examiner

AUTOMATED MODIFICATION OF IMAGING SCANNER FUNCTION BASED ON ORIENTATION

FIELD OF THE INVENTION

The present invention relates to barcode readers, and more specifically, to barcode readers having multiple orientations and corresponding functions.

BACKGROUND OF THE INVENTION

Barcode readers are used in a variety of venues. The purpose of a barcode reader can vary greatly from venue to venue as well as within the venue. In retail environments, a venue may have multiple barcode readers at a single station or point-of-sale for performing various functions. For example, a venue may have a first barcode reader for scanning barcodes on products, a second barcode scanner for reading checks and other forms of payment, and a third barcode reader for identifying objects in a basket. Each barcode reader provides different functions that use different configurations, such as illumination, field-of-view, and reading capabilities. It should be understood that barcode readers are capable of reading machine-readable indicia other than barcodes, including two-dimensional codes, such as QR codes.

Moving a single barcode reader from one orientation to another is time and resource intensive as a user often has to manually modify each of the settings affected by the new orientation and related functionality. Time and personnel are valuable resources to meet demand. As a result, venues install multiple barcode readers with a purpose of each barcode reader stationary in its orientation (or be dedicated to being operated in a hand-held mode), thus removing the need to ever change settings and functionality. Even though the use of multiple barcode readers is less costly in time and personnel resources, the cost of obtaining and maintaining extra barcode readers is a burden on the venue.

BRIEF SUMMARY OF THE INVENTION

A barcode or code reader may be configured to automatically adjust at least one setting in order to perform a functionality corresponding to a detected orientation of the barcode reader. In response to a sensor sensing a new orientation, the barcode reader may automatically select a corresponding function. The automatic selection of a function according to orientation may be performed in real time so that a process performed by the barcode reader and corresponding workstation may have limited, or no, interruption of operation. The barcode reader may be connected to a stand of a workstation or barcode reader system of a point-of-sale (POS) so that orientation is determined based on a configuration of a housing of the barcode reader. The housing may be detachably connected to the stand so that detaching of the barcode reader indicates a hands-free mode of operation. In an alternative embodiment, rather than being responsive to a change in orientation, the barcode reader may determine orientation in response to a request or activation of a reading function and adjust functionality and/or settings at that time based on the determined orientation. Orientation may alternatively be determined based on trained image position sensing in which analysis of the background of the imager's current field-of-view determines function of the scanner based on a comparison of pre-established images set during a "training" mode in which specific behavior is established in relationship to an image background (e.g., top surface of a scanner system).

One embodiment of a code reader may include a housing, an image sensor, and a processing unit. The code reader may include a set of orientations. The housing may be configured to be adjustably oriented. The image sensor may be disposed within the housing, and configured to capture an image of a target area. The processing unit may be disposed within said housing and in communication with the image sensor. The processing unit may be configured to, in response to determining an orientation of the housing, select a function so that the code reader is configured to perform the function corresponding with the determined orientation.

One embodiment of a method for reading a code may include determining an orientation of a housing inclusive of the code reader, selecting a function so that the code reader is configured to perform the function corresponding with the determined orientation, and capturing an image of a target area. The image may be processed based on the selected function.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Figure 1:
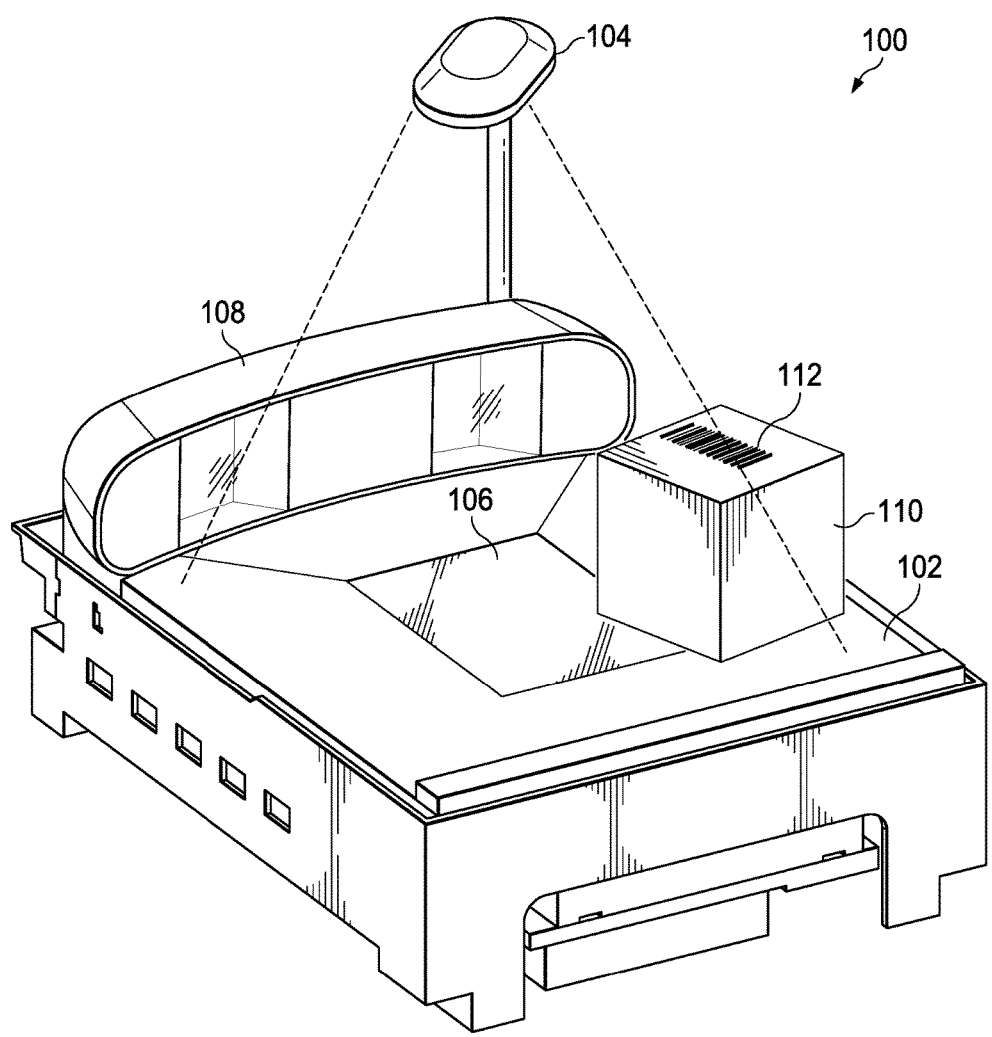
FIG. 1 is an illustration of an illustrative barcode reader system configured to read machine-readable indicia utilizing a code reader inside a housing having a set of orientations.

With regard to FIG. 1, an illustration of a barcode reader system 100 including a base 102 and code reader 104 configured to read machine-readable indicia is shown. The code reader 104 may be configured to be positioned in multiple orientations. The barcode reader system 100 may further include a first barcode scanner 106, and a second barcode scanner 108 to enable the barcode reader system 100 to read machine-readable indicia from three different angles to provide efficiency in reading a machine-readable indicia on an object, such as a consumer package. The barcode reader system 100 may be configured to identify item 110 by reading a machine-readable indicia 112 in a target area within a field-of-view of the barcode reader system 100. The machine-readable indicia 112 may be representative of a code (e.g., UPC code) associated with the item 110 that enables the barcode reader system 100 to identify the items for checkout at a store or other purpose. "Barcode" may refer to a "barcode," "code," or any other machine-readable indicia as known by one of skill in the art.

In one embodiment, the barcode reader system 100 may be configured to constantly scan the target area, such as, but not limited to, a scanning station. In response to identifying the existence of an item 110 in the target area, the first and second barcode scanners 106 and 108 and the code reader 104 may scan or image the machine-readable indicia 112 (e.g., barcode, QR code, or any other machine-readable code or markings) captured on the item 110. The barcode reader system 100 may have a variety of alternative configurations, as understood in the art.

Figure 2:
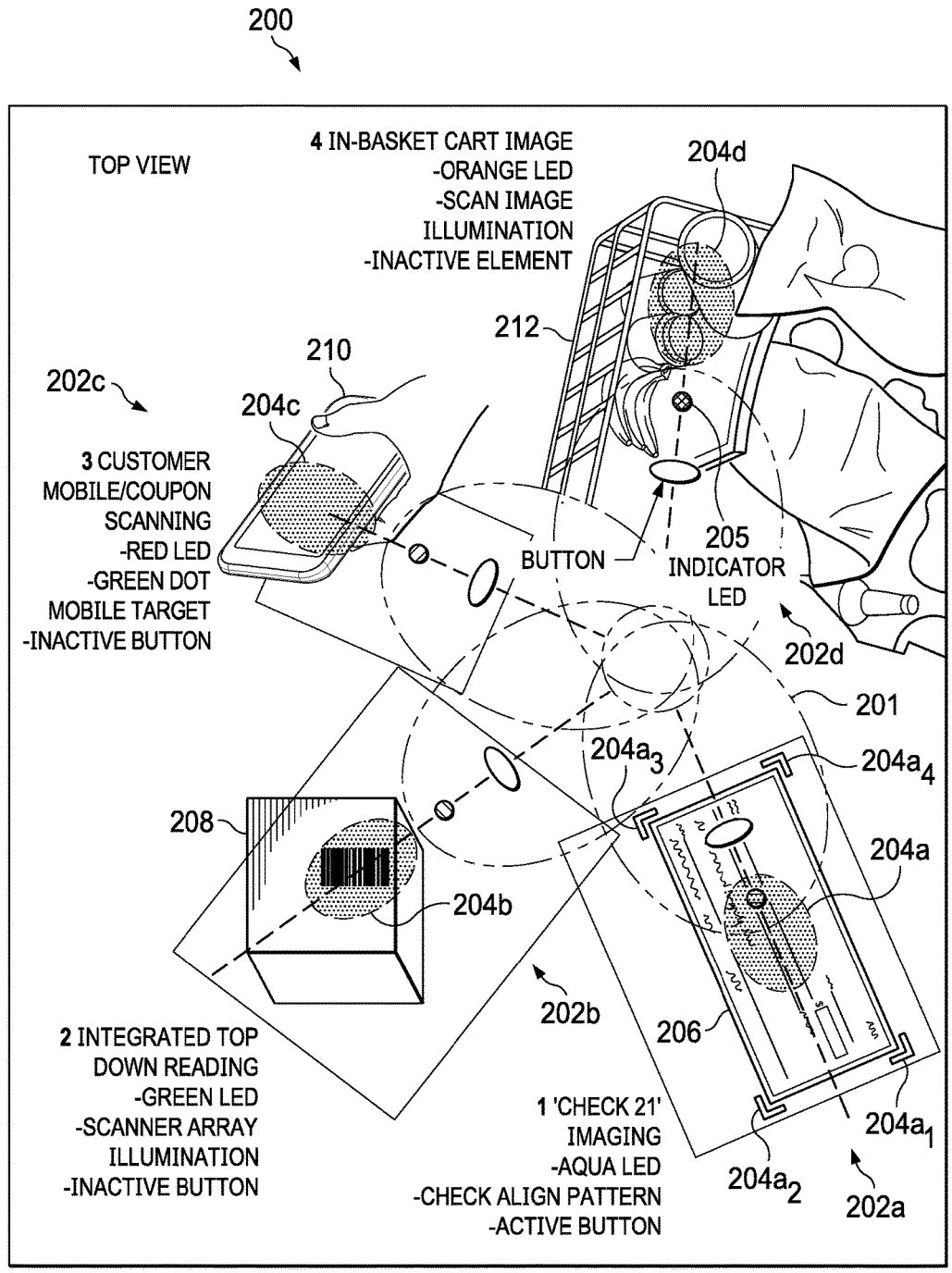
FIG. 2 is an illustration of an illustrative housing of a code reader in four different orientations.

With regard to FIG. 2, an illustration of a barcode reader 200 having a housing 201 of a code reader is shown in four different mutually different orientations 202a-202d (collectively 202). In one embodiment, the housing 201 includes a light source (not shown) that may illuminate a target area. In one embodiment, the housing 201 may include a target indicator light (not shown) that may provide a positioning spot or other indicator (e.g., rectangle corners $204a_1$-$204a_4$ (collectively 204a) 204a-204d (collectively 204) to indicate to a user where to place an item for reading. If different target indictor lights are used to support different functions of the barcode reader 104, then the barcode reader 104 may include a driver system (e.g., processor, optical source driver, etc.) to automatically select and control the appropriate light source(s) to turn on and off the light source(s) based on the selected function. In addition to a light source, a function indicator light 205 may be used to notify a user of the selected function. In one embodiment, the indicator light 205 may produce different colors (e.g., red, green, blue, violet), and each function may cause the function indictor light 205 to produce a different color. Alternatively, the function indicator light 205 may be composed of multiple lighting elements associated with different physical positions on the housing 201 to indicate different functions.

To operate the barcode scanner 200, the scanner 200 may be set to an automatic scan mode to continuously scan, scan in response to an event (e.g., identification of motion), periodically scan (e.g., scan every 0.1 seconds), or manually scan in response to a user pressing a button 207 to initiate a scan. In response to pushing the button 207, the scanner 200 may automatically determine a function based on orientation (e.g., angular, inclination, motion, background image content) of the scanner 200. Alternatively, the scanner 200 may be configured for a particular function based on orientation prior to a user pushing the button 207 (e.g., in response to a change in orientation, the scanner changes function, thereby being configured to a particular function prior to activation of a scan request by a user or automatic scanning, as previously described).

The barcode reader 200 may include different functions corresponding to the respective four orientations 202 of the housing 201. The functions may be automatically selected by adjusting at least one setting of the barcode reader 200. The settings may include, but are not limited to, depth of field, region of interest, type of data captured, type and format of data transmitted (e.g., fully decoded barcode data in a case of a customer facing scanner function versus time-synced frame contents in the case of a top down reader, and non-synced images in a case of an in-basket scanner and check imager, such as a Check 21 imager). Transition from one function to another may be achieved dynamically in real-time or near-real-time so that transmission from the code reader is seemingly, or actually, instantaneous to avoid usage disruption or delay.

Figure 5:
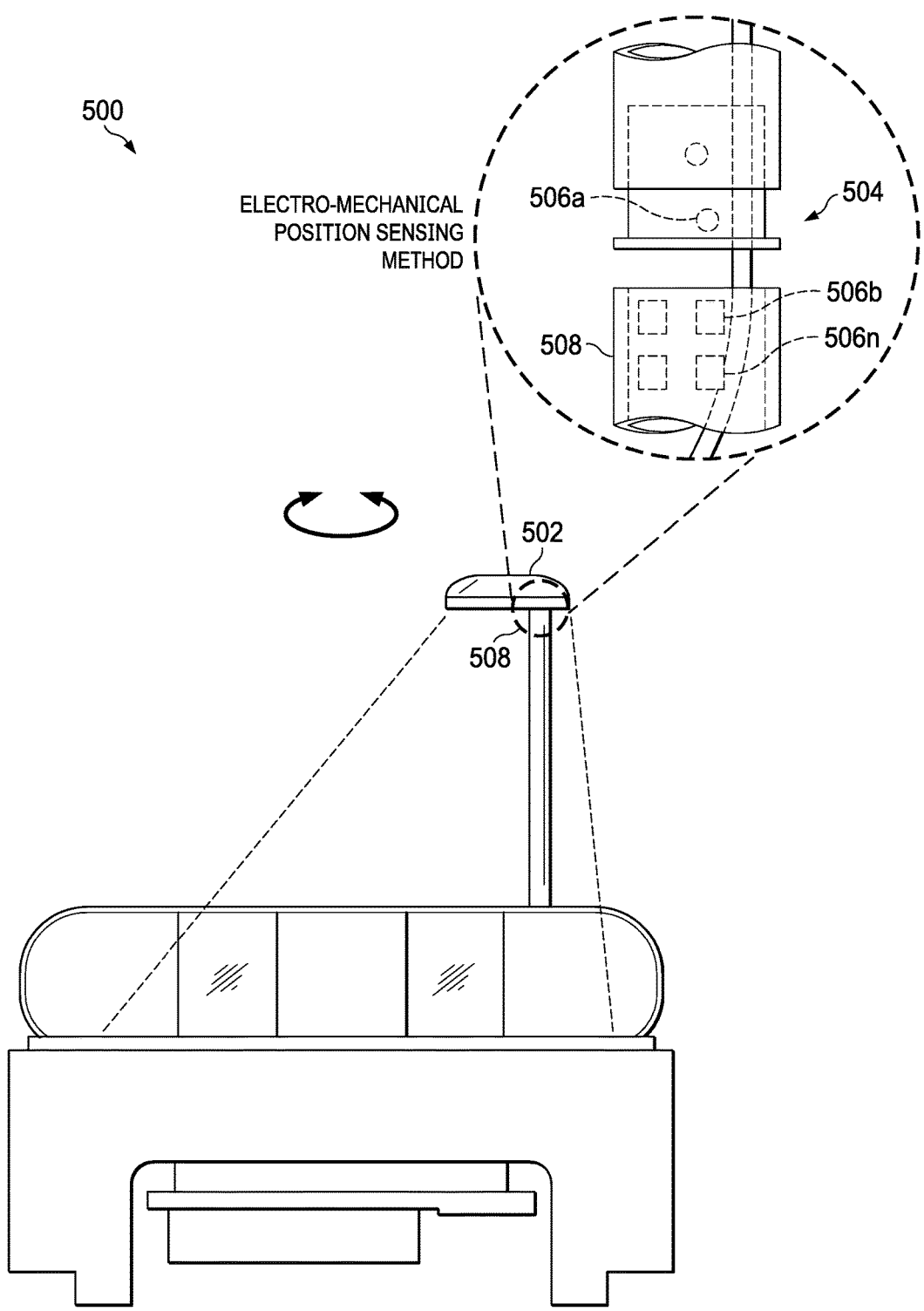
FIG. 5 is an illustration of an illustrative barcode reader system having a code reader inclusive of an electromechanical sensor used to determine orientation.
Figure 9:
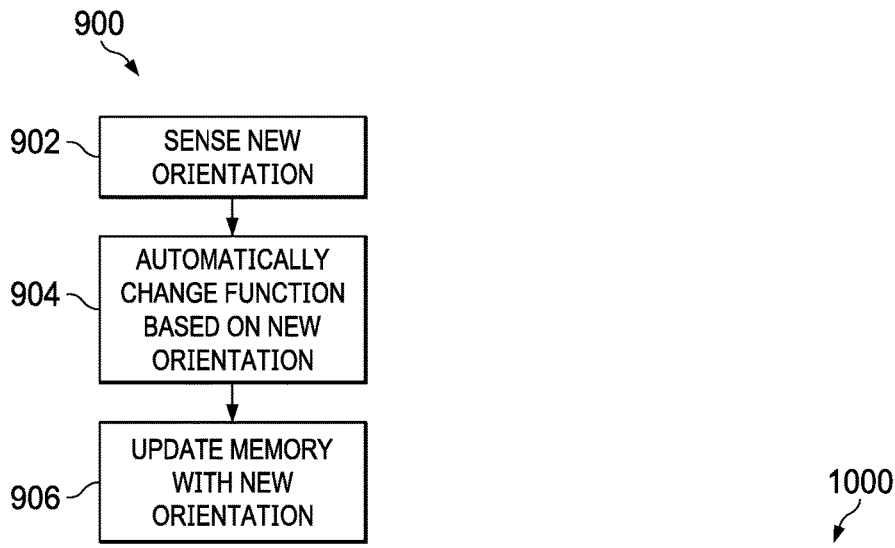
FIG. 9 is a flow diagram of an illustrative method of automatically selecting a function of a code reader based on an orientation thereof.
Figure 10:
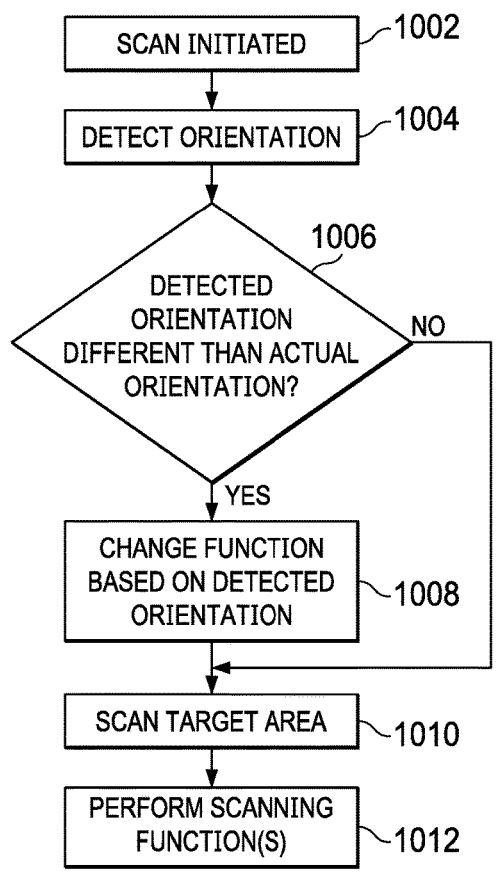
FIG. 10 is a flow diagram of an illustrative method of automatically selecting a function of a code reader based on an orientation thereof.

The barcode reader 200 may automatically change functions in response to a change in orientation of the housing 201. In one embodiment, a change in orientation is sensed by at least one electromechanical sensor, such as shown in FIGS. 5 and 9, and communicated to the barcode reader 200 so that the barcode reader 200 may automatically select a function corresponding to the orientation of the housing 201. In one embodiment, a scan may initiated, such as shown in FIG. 10, and the orientation of the housing 201 may be determined initially by an image captured of a background portion of the target area. For example, determining an orientation of the housing 201 based on the image of the target area may include identifying known features (e.g., scanning window or a base of a barcode scanner system) in a background portion of the image of the target area that correspond with a function corresponding with the orientation of the housing 201. The barcode reader 200 is shown in four orientations 202 as an example, and an alternative number of orientations corresponding with different functions may be supported.

A first orientation 202a of the housing 201 may be a check imaging orientation. A function of the barcode reader 200 in the check imaging orientation may be an imaging function. The barcode reader 200 may capture an image of a check 206 that a user has placed in the target area. In an embodiment, the barcode reader 200, in response to the barcode reader 200 entering into a check imaging function, one or more illumination devices may be turned on to define a region in which a check (or other item) may be placed. The illumination devices may define a rectangle in which the check is to be placed, for example, thereby supporting specific functionality of processing checks, which generally has a higher degree of image processing than barcode scanning. The imaging function may include auto-sizing and meeting pixel requirements for check processing applications, such as, for example, Check 21 processing. The imaging function may include parallax corrections as well as other imaging corrections for reading and verifying checks known to one of skill in the art.

In one embodiment, the orientations 202 may be determined by angular or other (e.g., inclination) orientation of the housing 201. In another embodiment, the orientations may be determined by identifying a background portion (e.g., outline on a base, sticker, text, or other fixed feature in the target area). Orientation may be determined by a variety of alternative methods, as further described herein.

A second orientation 202b of the housing 201 may be a barcode scanner orientation. A function of the barcode reader 200 in the barcode scanner orientation 202b may be to constantly, periodically, or aperiodically scan the target area. In response to identifying an item 208 in the target area, the code reader may scan or image a machine-readable indicia disposed on the item 208. The barcode reader 200 may communicate the image to a POS system optionally to be processed with images captured by additional scanners below and to a side of the item 208 (see FIG. 1, for example).

The barcode reader 200 may also be configured to identify a code associated with the item 208 by reading the machine-readable indicia and communicating the code associated with the item 208 to an external processing unit (e.g., POS system). Orientation of the housing 201 may be determined by at least those methods as described hereinabove with reference to the check imaging orientation as well as identifying a machine-readable indicia in the target area.

A third orientation 202c of the housing 201 may be a mobile device reader orientation for reading a machine-readable indicia displayed on a screen of a mobile device 210. A function of the barcode reader 200 in the mobile device reader orientation 202c may be image processing that has different settings than those used to read barcodes on items. The barcode reader 200 may read or capture an image on the mobile device 210. The barcode reader 200 may then transmit the image to an external processing unit. The barcode reader 200 may provide a positioning spot 204c to indicate to a user where to place the mobile device 210 to optimize reading the screen of the mobile device 210. The screen of the mobile device 210 may display an image of a number of illustrative items related to point-of-sale transactions, such as, but not limited to, coupons, payment information, venue membership information, and other items known to those of skill in the art for use in purchasing or paying for items. Orientation may be determined by at least those methods as described hereinabove with reference to the check imaging orientation as well as identifying a mobile device or an illuminated screen in the target area.

A fourth orientation 202d of the housing 201 may be an in-basket orientation for scanning contents of a basket 212. A function of the barcode reader 200 in the in-basket orientation 202d may be image processing as well as changing a focal distance or field-of-view settings or parameters of the barcode reader 200. The barcode reader 200 may capture and process images of the basket 212 to determine a variety of parameters, such as, but not limited to, how many items remain in the basket 212, if any items are hidden underneath other items in the basket 212, how many of a same item are in the basket 212 to speed up check-out time, and other parameters known to those with skill in the art.

Figure 3:
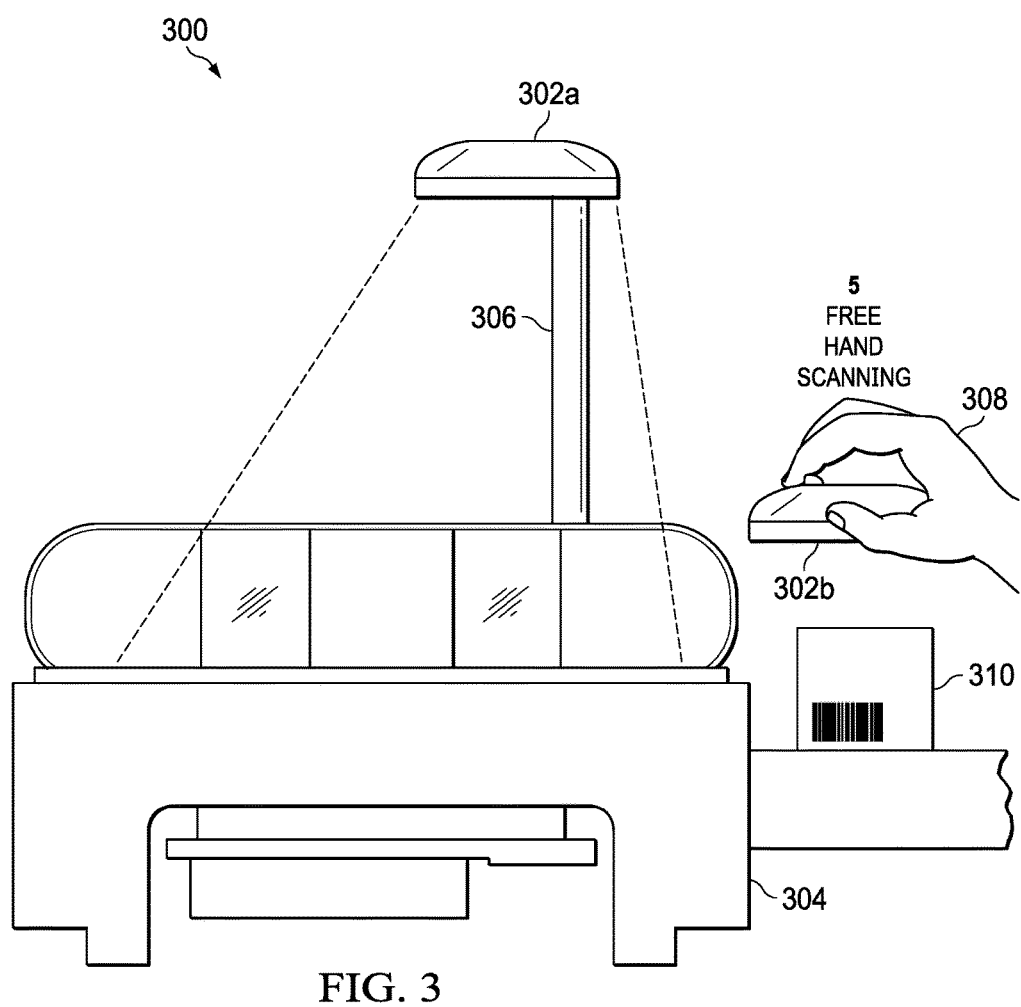
FIG. 3 is an illustration of an illustrative code reader in a fifth orientation, which is a handheld scanning orientation.

With regard to FIG. 3, an illustration of a barcode reader system 300 having a barcode reader 302a and 302b (collectively 302) in a handheld scanning orientation 303 is shown. The barcode reader system 300 may include a base 304 that may operate as a portion of a POS, and to which a support stand 306 may be connected. The barcode reader 302 may be detached, by a user 308, from the support stand 306 for use in a handheld reading function mode. The barcode reader 302b in the handheld reading function mode may allow the user 308 to scan or image an item 310 that is not within a field-of-view of the code reader 302a in an attached orientation when positioned on the support stand 306.

In one embodiment, a function of the code reader 302 in the handheld scanning orientation 303 may be image processing and data storage. The code reader 302 may be configured to scan a target area for an item inclusive of a machine-readable indicia. In one embodiment, the barcode reader 302b in a handheld reading function mode may transmit an image of the target area back to the base 304, for example, a point-of-sale station, through a wireless communication system, such as, but not limited to, WiFi®, Bluetooth®, NFC®, wired, or other communication methods known to those of skill in the art.

In another embodiment, the barcode reader 302b in the handheld mode may store any gathered information from the item 310 in local memory. In an embodiment, the locally stored data may be transmitted to the base 304 when the code reader 302b is re-attached to the support stand 306. The stored data may include product information, venue information read from a barcode (e.g., UPC barcode), item count, item sizes, images, OCR data, as well as other data relevant to consumer goods.

The handheld scanning orientation 303 may be determined by any of the processes described hereinabove with reference to FIG. 2, as well as other methods one of skill in the art will appreciate with regard to handheld devices. For example, in one embodiment, orientation may be determined by a gravimeter disposed within a housing of the barcode reader 302. Alternatively and/or additionally, accelerometer(s) to sense motion, inclinometer to sense inclination, or other motion or orientation sensor may be utilized. In one embodiment, the barcode reader 302 may sense detachment from the base 304. In one embodiment, a power feed may be disconnected at detachment and the barcode reader 302 may sense a lack of power feed and/or beginning to use power local to the barcode reader 302, such as, but not limited to, a battery, a capacitor, a set of capacitors, a super capacitor, or any other power supply method known to those of skill in the art. A motion or other sensor may alternatively be used to sense that the barcode reader 302 is in a handheld scanning orientation 303. In an embodiment, a determination that the barcode reader 302 is in the orientation 303 may be performed in response to being detached from the support stand 306, in response to being moved, or commanded to perform a scan, as further described herein.

Figure 4:
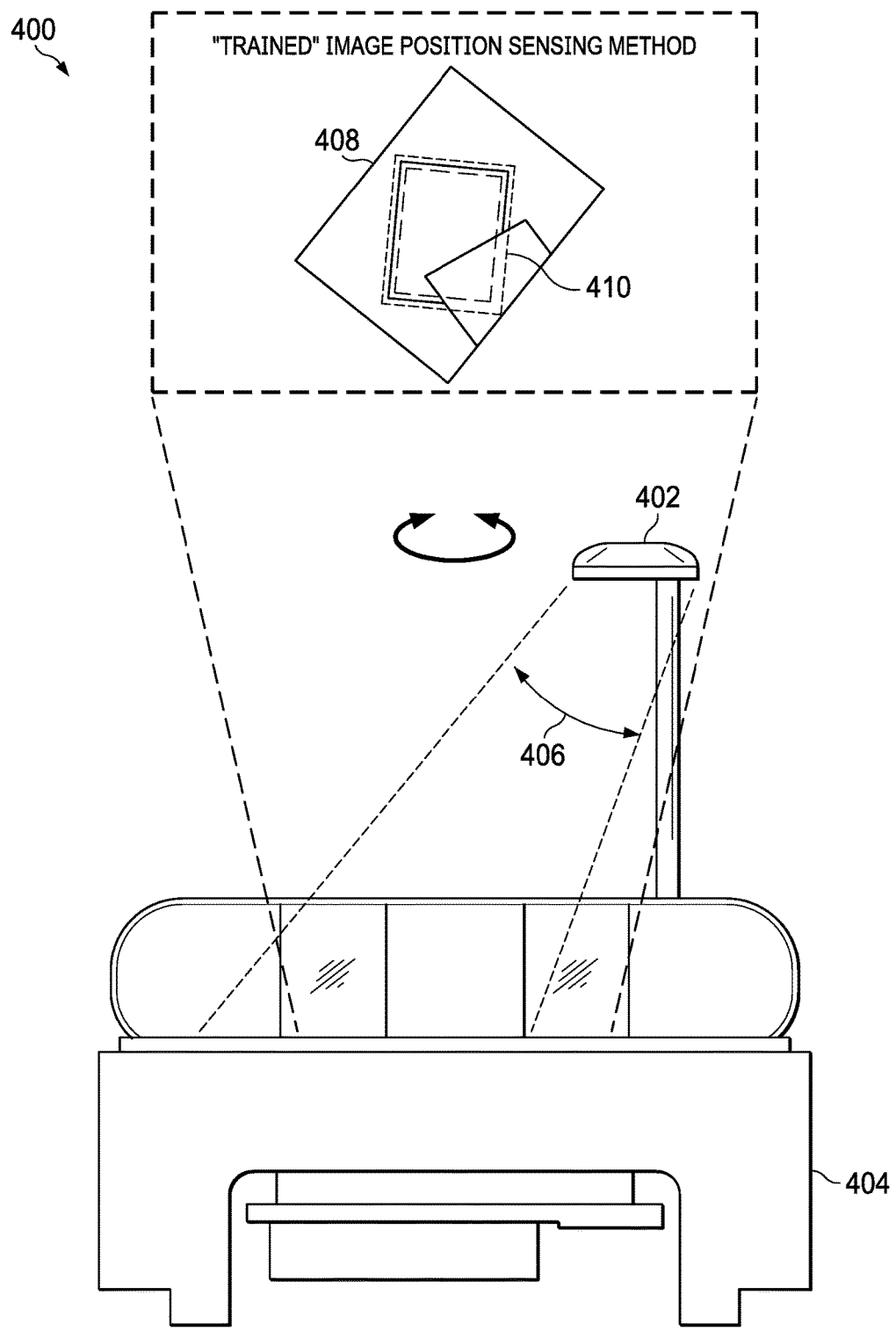
FIG. 4 is an illustration of an illustrative barcode reader system having a code reader configured to perform trained image position sensing to support orientation identification.

With regard to FIG. 4, an illustration of a barcode reader system 400 having a barcode reader 402 configured to perform scanning when in a "trained" image position to support orientation identification is shown. The barcode reader system 400 may include the barcode reader 402 and a base 404, as previously described with respect to FIG. 3. The barcode reader 402 may be configured to have a field-of-view 406 in which the barcode reader 402 may scan for items. The base 404 may include at least one template 408 that the barcode reader 402 has been trained to identify as corresponding with an orientation. The barcode reader 402 may include a guide template 410 that may assist in aligning with the template 408 as well as orientation detection.

In one embodiment, one or more orientations of a housing of the barcode reader 402 may include a respective template that the barcode reader 402 may be trained to identify. The different trained templates may include different configurations (e.g., markings, fixed features, such as scan window edges, stickers, or otherwise) so that the barcode reader 402 may identify a corresponding orientation based on the configuration of the trained template 408.

With regard to FIG. 5, an illustration of a barcode reader system 500 having a barcode reader 502 inclusive of an electromechanical sensor 504 formed of electrodes 506a-506n (collectively 506), positioned on a support stand 508, and used to determine orientation is shown. Rather than using electrodes, alternative sensing devices, such as optical sensors or otherwise, may be utilized to enable the barcode reader 502 to determine orientation of the reader 502. The electrodes 506 may provide voltage signal(s) that the barcode reader 502 may measure to determine angular orientation of the barcode reader 502. In an embodiment, as the barcode reader 502 is rotated, different signals may be read from a configuration of the electrodes 506. For example, the electrodes 506 may be configured such that when the different electrodes 506 are contacted by a set of complimentary electrodes in electrical communication with the barcode reader 502, a respective binary signal is communicated or sensed by the barcode reader 502.

In one embodiment, the electromechanical sensors 508 may be include a pre-determined number of sensors configured so that varying angular orientations of the housing cause different electrodes or sensors to align so that the orientation signal may represent a configuration of the electrodes 506 and a corresponding orientation. The stand of the base 504 and the connecting mechanism may house a wire that electrically couples the barcode reader 502 to the base 504. In one embodiment, the wire may transmit a power source from the base 504 to the barcode reader 502. In one embodiment, the wire may also be configured to support data communications between the barcode reader 502 and the base 504.

Figure 6:
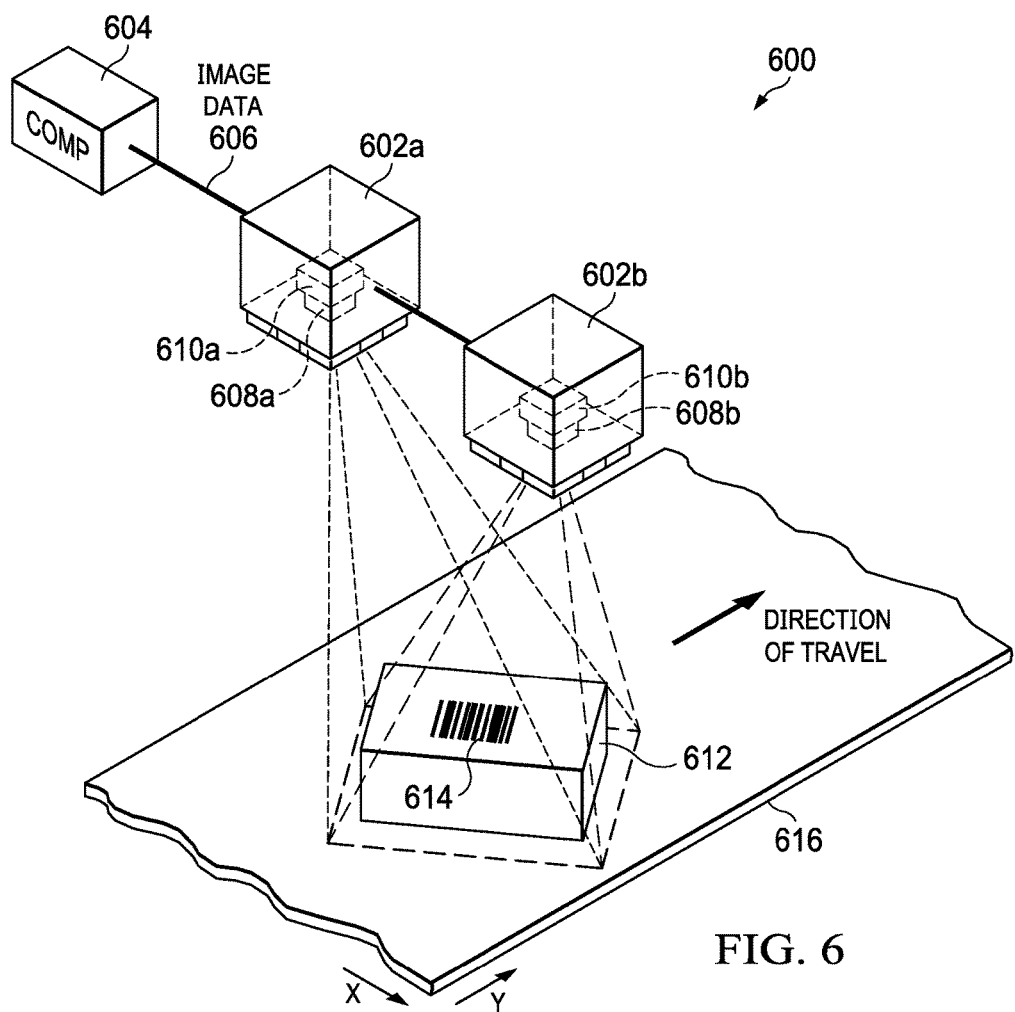
FIG. 6 is an illustration of an illustrative machine-readable indicia scanner for use in scanning machine-readable indicia, such as barcodes, QR codes, or other machine-readable indicia along with physical dimensions of products or packaging.

With regard to FIG. 6, an illustration of a machine-readable indicia scanner system 600 for use in scanning machine-readable indicia, such as barcodes, QR codes, or other machine-readable indicia along with physical dimensions of products or packaging is shown. The scanner system 600 may additionally and/or alternatively be configured to operate as a product inspection system or logistics processing system. The scanner system 600 may include cameras 602a and 602b (collectively 602) configured to capture images of an object 612, and generate image data 606 and/or data (e.g., codes) representative of the machine-readable indicia. The cameras 602 may include optics 608a and 608b (collectively 608), which may include lens(es), window, optical filter(s), and so on, and image sensors 610a and 610b (collectively 610) may be used for imaging a scene. In an embodiment, the image data 606 captured by the cameras 602 may be communicated to a computer system 604 for processing (e.g., reading a code from a machine-readable indicia) thereby. Alternatively, the cameras 602 may be configured with processing units (not shown) to process image data 606 and generate data derived therefrom (e.g., text representative of machine-readable indicia). In an embodiment, the cameras 602 and computer system 604 may be formed as single units. In one embodiment, the cameras 602 are configured (e.g., spatially aligned) so that the image data 606 from camera 602a and camera 602b may combine to produce a three dimensional image, as understood in the art. Although the scanner system 600 shows two cameras 602, a single camera or more than two cameras may be utilized to capture images from similar or different angles.

In an embodiment, the cameras 602 may identify markings, such as words, stickers, or features on a conveyer belt 616 that cause the cameras 602 to automatically enter a certain function or establish certain parameter(s).

As shown, an object 612 on which a machine-readable indicia 614 is positioned on the conveyer belt 616 that operates to move the object 612 along a direction of travel of the conveyer belt 616. When the cameras 602 image the object 612, the optics 608 and image sensors 610 may have some level of blur in the image, thereby being problematic for conventional image processing, as previously described. Depending on height of the object 612, speed of the conveyer belt 616, resolution of a machine-readable indicia 614 associated with, in this case attached to, the object 612, illumination of the indicia 614, optical noise, and so on may also contribute to difficulty in reading or decoding the indicia 614 by conventional image processing techniques. As a result, a processing unit of the computer system 608 may be configured to automatically utilize an algorithm that generates a virtual scanline in response to recognition of certain system parameters and machine-readable indicia type (acting as different "orientations" and corresponding "functions") to be able to more accurately determine or decode codewords of the machine-readable indicia.

Figure 7:
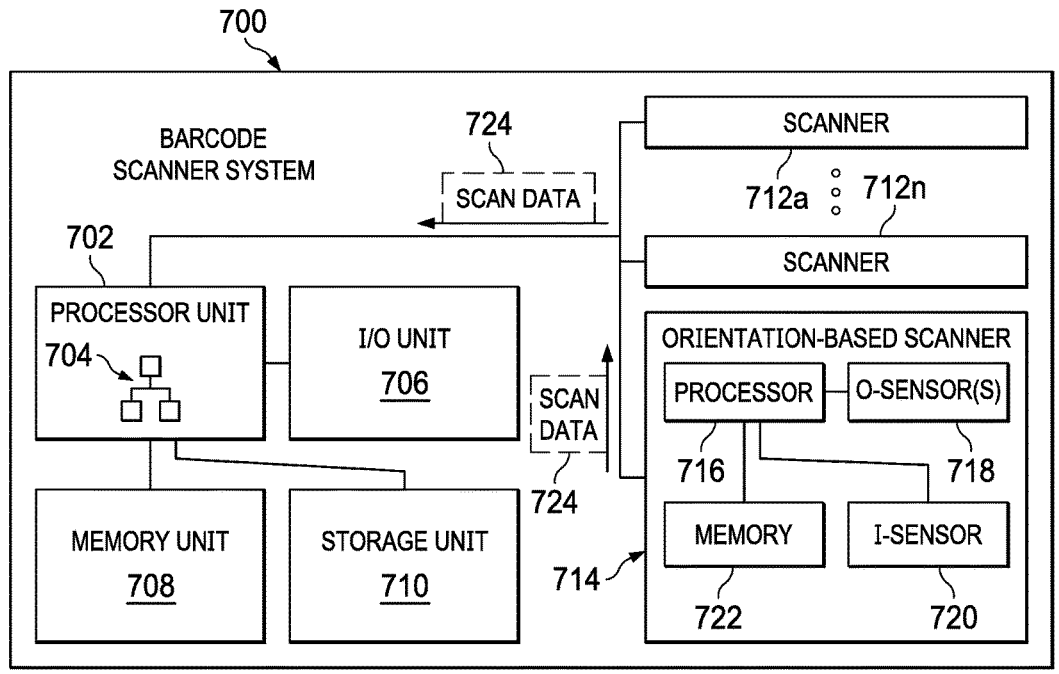
FIG. 7 is a block diagram of illustrative components of a code reader system that selects a function for a code reader based on an orientation thereof.

With regard to FIG. 7, a block diagram of components of a code reader system 700 that selects a function for a code reader based on an orientation thereof is shown. The code reader system 700 may include a processing unit 702, an input/output (I/O) unit 706 for communicating data, such as image data, a memory unit 708, a storage unit 710, scanners 712a-712n (collectively 712), and an orientation-based scanner 714.

The processing unit 702 may include a single processor or multiple processors. The processing unit 702 may further include suitable logic, circuitry, and interfaces that are operable to execute one or more instructions 704, such as, for example, modules 800 of FIG. 8, based on sensor and other data received to perform operations of a scanner. The processing unit 702 may be realized through a number of processor technologies known in the art. The examples of the processing unit 702 may include, but are not limited to, an x86 processor, an ARM processor, a Reduced Instruction Set Computing (RISC) processor, an Application-Specific Integrated Circuit (ASIC) processor, an image processor, a digital signal processor, or a Complex Instruction Set Computing (CISC) processor. The I/O unit 706 may be configured to communicate data over a communications network (e.g., the Internet, wireless communications network, and so on).

The orientation-based scanner 714 may be any of the code readers described herein with reference to FIGS. 1-6. The orientation-based scanner 714 may include a processing unit 716, one or more orientation sensors 718, an image sensor 720, and memory 722. The scanners 712 and orientation-based scanner 714 may communicate scan data 724 to the processing unit 702. The scan data 724 may include data corresponding with an orientation of a housing of the orientation-based scanner 714. The scan data 724 may include image data, code represented by a machine-readable indicia, or other data format that may be used or combined with other data by another processor operating on a host system (e.g., POS system), for example, based on a function in which the orientation-based scanner 714 is operating. It should be understood that the use of the housing as an orientation reference is arbitrary, and that any other object, such as a portion of a stand on which a barcode scanner is positioned, may be considered relative to the housing.

The orientations sensor(s) 718 may be any sensor that is capable of measuring angular or other position of the orientation-based scanner 710. The image sensor 720 may include an optical camera and processing unit or otherwise (i) that enables a visual orientation of the orientation-based scanner 710 to be used in determining orientation as well as (ii) captures images to perform reading of machine-readable indicia or otherwise.

Figure 8:
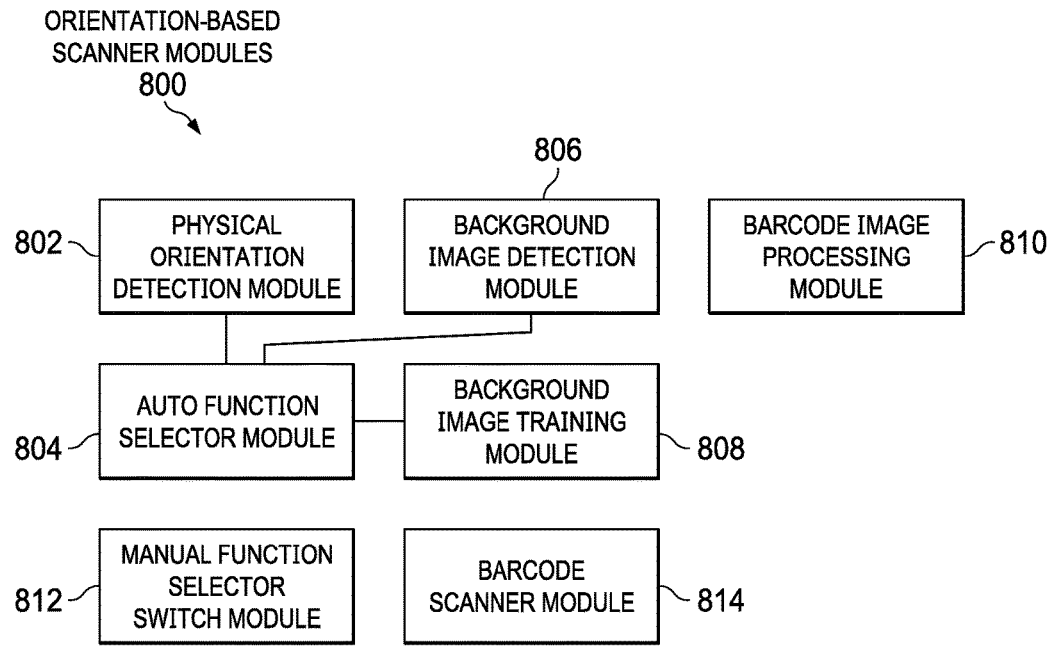
FIG. 8 is a block diagram of illustrative modules performed by a code reader system configured to automatically select functions based on orientation and perform barcode reading using a selected function.

With regard to FIG. 8, a block diagram of modules 800 executed by a barcode reader system or barcode reader configured to automatically select and perform functions based on orientation and perform barcode reading using a selected function is shown. The modules 800 may include modules for detecting orientation and selecting a corresponding function, such as, but not limited to, a physical orientation detection module 802, an automatic function selector module 804, a background image detection module 806, and a background image training module 808. The physical orientation detection module 802 may include detecting an orientation and/or a change in orientation. The automatic function selector module 804 may be configured to select a function corresponding with an orientation detected by the physical orientation detection module 802. In an embodiment, the number of available functions may be five, as described with regard to FIGS. 2 and 3. Other numbers of functions are also possible.

The background image detection module 806 may be configured to detect a background according to any of the hereinabove described background detection methods. The background image detection module 806 may be configured to search for and detect pre-determined parameters of a background image obtained by an image sensor. The background image training module 808 may include capturing an image of a background when the barcode reader is in an orientation, and processing an indicator of a portion, or all, of an image captured by an image sensor. The image captured or derivation thereof may be stored in memory and a corresponding orientation may be assigned thereto. The background image training module 808 may include identifying parameters of a background image obtained by the image sensor that may be easily detected in subsequent scans of objects with the same background. For example, a rectangle in which checks are scanned may be used to define a recognizable pattern that is within a background portion of an image when the scanner is rotated or otherwise positioned to capture an image inclusive of the rectangle, thereby informing the module 804 of the barcode reader to change to a check reader function. Additionally and/or alternatively colors, shapes, or other visually distinguishing features on a surface that defines a background portion of an image of a target area in which objects may be scanned may be utilized to determine orientation via image training and image processing.

The modules 800 may also include a barcode image processing module 810, a manual function selector switch module 812, and a barcode scanner module 814. In one embodiment, the manual function selector switch module 812 receives a communication, such as a signal from a switch or user interface, from a user in order to direct the processing to select a function identified in the user communication. The barcode scanner module 814 may include scanning a machine-readable indicia on an item in a field-of-view of a code reader inclusive of the modules 800. The barcode scanner module 814 may further include capturing an image of a machine-readable indicia, or barcode, disposed on the item. The machine-readable-indicia may be a code representative of the item. The barcode image processing module 810 may include (i) receiving an image of a machine-readable indicia from the barcode scanner module 814 and (ii) processing the image to determine the code of the machine-readable indicia representative of the item.

With regard to FIG. 9, a flow diagram of a method 900 of automatically selecting a function of a code reader based on an orientation thereof is shown. The method 900 may include a step 902 of sensing a new orientation of a housing of the code reader. In sensing the new orientation, any of the hereinabove referenced sensing methods, such as, for example, sensing a new orientation of a housing of a code reader by an electromechanical sensor may be used.

The method 900 may then automatically change a function of the code reader based on the new orientation at step 904. A processing unit of the code reader may access a database or table in a memory of corresponding functions and orientations. Based on the new orientation, the processing unit may select the corresponding function as listed in the database. In one embodiment, the processing unit may receive an orientation signal indicating that a new orientation has been sensed. The processing unit may respond to the orientation signal to identify the new orientation. In another embodiment, the new orientation may be identified in the orientation signal. For example, if a set of electrical contacts define different positions of the barcode reader, then the processing unit may switch a function corresponding to the identified orientation (e.g., 1=barcode scanning, 2=check scanning, etc.). At step 906, the processing unit may update a portion of memory with the new orientation.

With regard to FIG. 10, a flow diagram of a method 1000 of automatically selecting a function of a code reader based on an orientation thereof is shown. The method 1000 may begin with step 1002 when a scan is initiated. In one embodiment, the scan is initiated in response to a user communicating to a processing unit of a code reader to initiate a scan, such as, for example, squeezing a button or trigger on the code reader to initiate the scan. In another embodiment, the scan may be automatically initiated by identifying an item entering into a target area. The scan may be automatically initiated and the item sensed by at least one of electronics internal to the code reader and electronics external to the code reader.

At step 1004, an orientation of the housing may be detected. In one embodiment, the code reader may include a sensor for sensing orientation of the housing. In another embodiment, the orientation may be detected by an image of a background of the target area. One of skill in the art will appreciate that many methods exist for detecting orientation, such as, but not limited, the methods of detecting orientation as described herein. At step 1006, the processing unit may determine if the detected orientation is different than a current orientation as stored in memory. If the orientations are different, the processing unit may change a function of the code reader based on the detected orientation at step 1008. In one embodiment, the processing unit may update the current orientation in memory with the detected orientation. At step 1010, the code reader may scan the target area using a function corresponding to the detected orientation. The processing unit may direct components of the code reader to perform scanning functions corresponding with the detected orientation at step 1012. The functions may be functions described hereinabove with reference to FIGS. 1-6. The difference between the processes 900 and 1000 is the trigger as to when a function of the barcode reader is changed.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

What is claimed:

1. A code reader having a set of orientations, comprising:
   a housing configured to be adjustably oriented relative to a support stand when supported thereby;
   an image sensor disposed within said housing, and configured to capture an image of a target area; and
   a processing unit disposed within said housing, and in communication with said image sensor, said processing unit configured to, in response to determining an orientation of said housing relative to the support stand, select a corresponding function from at least two of a (i) check imaging function, (ii) barcode scanning function, (iii) mobile device reading function, (iv) in-basket barcode reading function, based on the determined orientation of the housing relative to the support stand so that the code reader is configured to perform the function corresponding with the determined orientation of the housing relative to the support stand,
   sense a change in orientation of said housing relative to the support stand while positioned on the support stand; and
   communicate an orientation signal to said processing unit to cause said processing unit to determine orientation of said housing relative to the support stand.

2. The code reader according to claim 1, wherein said processing unit is further configured to determine the orientation of said housing based on the image of the target area.

3. The code reader according to claim 2, wherein said processing unit, in determining the orientation, is configured to identify known features disposed in a background portion of the image of the target area.

4. The code reader according to claim 1, wherein said processing unit, in determining the orientation, is configured to compare features in a background portion of the image established during a training session of the code reader.

5. The code reader according to claim 1, wherein the processing unit is further configured to capture an image based on the selected corresponding function.

6. The code reader according to claim 1, wherein said processing unit, in selecting the function, is configured to adjust at least one setting of said code reader that corresponds with the function.

7. The code reader according to claim 1, wherein said housing is configured to be rotatable about the support stand.

8. The code reader according to claim 1, wherein the processing unit is configured to select the corresponding function in response to a user input which then triggers the determination of the orientation of said housing when supported by the support stand.

9. The code reader according to claim 1, wherein said processing unit is further configured to enter a handheld mode of operation responsive to sensing that the housing is unmounted from the stand.

10. A code reader having a set of orientations, comprising:
    a housing configured to be adjustably oriented relative to a support stand when supported thereby;
    an image sensor disposed within said housing, and configured to capture an image of a target area;
    a processing unit disposed within said housing, and in communication with said image sensor, said processing unit configured to, in response to determining an orientation of said housing relative to the support stand, select a corresponding function based on the determined orientation of the housing relative to the support stand so that the code reader is configured to perform the function corresponding with the determined orientation of the housing relative to the support; and an electromechanical sensor positioned on the support stand and in communication with said processing unit, and configured to:

sense a change in orientation of said housing relative to the electromechanical sensor on the support stand; and communicate an orientation signal to said processing unit to cause said processing unit to determine orientation of said housing.

11. The code reader according to claim 10, wherein the orientation of said housing is an angular orientation relative to said electromechanical sensor on the support stand.

12. A method for reading a code, comprising:

determining an orientation of a housing inclusive of a code reader while the housing is adjustably mounted to a support stand;

automatically selecting a function from at least two of a (i) check imaging function, (ii) barcode scanning function, (iii) mobile device reading function, (iv) in-basket barcode reading function, corresponding with the determined orientation so that the code reader is configured to perform the function corresponding with the determined orientation while the housing is adjustably mounted to the support stand;

sensing a change in orientation of the housing relative to the support stand while positioned on the support stand; and determining orientation of the housing relative to the support stand; and capturing an image of a target area.

13. The method according to claim 12, further comprising:

sensing a change in orientation of the housing relative to the support stand by an electromechanical sensor positioned on the support stand; and communicating an orientation signal to the processing unit to cause the processing unit to determine orientation of the housing.

14. The method according to claim 13, wherein sensing the change in orientation of the housing includes sensing a change in angular orientation of the housing relative to the support stand.

15. The method according to claim 12, wherein capturing an image includes capturing an image based on the selected function.

16. The method according to claim 15, wherein determining the orientation of the housing includes determining the orientation of the housing based on the image of the target area.

17. The method according to claim 16, wherein the determining the orientation of the housing based on the image of the target area includes identifying known features in a background portion of the image of the target area corresponding with the function corresponding with the determined orientation.

18. The method according to claim 12, wherein determining orientation of the housing includes comparing features in a background portion of the image established during a training session of the code reader.

19. The method according to claim 12, further comprising entering a handheld mode of operation responsive to sensing that the housing is unmounted from the stand.

20. A code reader having a set of orientations, comprising:

a housing configured to be rotatable about a support stand when supported thereby;

an image sensor disposed within said housing, and configured to capture an image of a target area;

a processing unit disposed within said housing, and in communication with said image sensor, said processing unit configured to, in response to determining an orientation of said housing relative to the support stand, select a corresponding function based on the determined orientation of the housing relative to the support stand so that the code reader is configured to perform the function corresponding with the determined orientation of the housing relative to the support; and electrodes positioned on the support stand configured to contact with complementary electrodes positioned on the housing such that different signals are detected by the code reader depending on the orientation of the housing relative to the support stand.

* * * * *